United States Patent
Teicholz et al.

(10) Patent No.: US 11,142,329 B2
(45) Date of Patent: *Oct. 12, 2021

(54) PRE-START MOTORING SYNCHRONIZATION FOR MULTIPLE ENGINES

(71) Applicant: United Technologies Corporation, Farmington, CT (US)

(72) Inventors: Matthew D. Teicholz, Mystic, CT (US); James W. Dunn, South Windsor, CT (US); Christopher P. Kmetz, Amston, CT (US); Louis A. Celiberti, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/812,862

(22) Filed: Mar. 9, 2020

(65) Prior Publication Data
US 2020/0207482 A1 Jul. 2, 2020

Related U.S. Application Data

(63) Continuation of application No. 15/216,233, filed on Jul. 21, 2016, now Pat. No. 10,618,666.

(51) Int. Cl.
*B64D 31/02* (2006.01)
*F02C 9/42* (2006.01)
(Continued)

(52) U.S. Cl.
CPC .............. *B64D 31/02* (2013.01); *B64D 27/12* (2013.01); *F01D 13/003* (2013.01); *F01D 19/00* (2013.01);
(Continued)

(58) Field of Classification Search
CPC ...... B64D 31/02; B64D 31/12; F05D 2270/13; F01D 13/003
See application file for complete search history.

(56) References Cited

U.S. PATENT DOCUMENTS

| 1,951,875 A | 3/1934 | Laabs |
| 2,617,253 A | 11/1952 | Fusner et al. |

(Continued)

FOREIGN PATENT DOCUMENTS

| EP | 1258618 A2 | 11/2002 |
| EP | 2305986 A2 | 4/2011 |

(Continued)

OTHER PUBLICATIONS

European Office Action; Application No. 16.133755, dated Jul. 22, 2020; 6 pages.

(Continued)

*Primary Examiner* — Todd E Manahan
*Assistant Examiner* — Alyson Joan Harrington
(74) *Attorney, Agent, or Firm* — Cantor Colburn LLP

(57) ABSTRACT

An aspect includes a system for pre-start motoring control for multiple engines of an aircraft. The system includes a first engine starting system of a first engine and a controller. The controller is operable to control a motoring time of the first engine starting system relative to one or more other engine starting systems of one or more other engines of the aircraft by adjusting the motoring time of the first engine starting system within a tolerance of the motoring time of the one or more other engine starting systems in a pre-start motoring sequence.

20 Claims, 7 Drawing Sheets

(51) Int. Cl.

| | | |
|---|---|---|
| *F01D 19/00* | (2006.01) | |
| *F01D 25/34* | (2006.01) | |
| *F02C 7/275* | (2006.01) | |
| *F02C 7/26* | (2006.01) | |
| *F01D 13/00* | (2006.01) | |
| *B64D 27/12* | (2006.01) | |
| *F01D 21/00* | (2006.01) | |
| *F02C 7/268* | (2006.01) | |

(52) U.S. Cl.
CPC ........... *F01D 21/003* (2013.01); *F01D 25/34* (2013.01); *F02C 7/26* (2013.01); *F02C 7/268* (2013.01); *F02C 7/275* (2013.01); *F02C 9/42* (2013.01); *F05D 2220/323* (2013.01); *F05D 2260/85* (2013.01); *F05D 2270/13* (2013.01); *F05D 2270/14* (2013.01)

(56) References Cited

U.S. PATENT DOCUMENTS

| | | |
|---|---|---|
| 2,840,987 A | 7/1958 | Bloomberg et al. |
| 2,962,597 A | 11/1960 | Evans |
| 3,057,155 A | 10/1962 | Rizk |
| 3,098,626 A | 7/1963 | Messinger |
| 3,151,452 A | 10/1964 | Bunger et al. |
| 3,764,815 A | 10/1973 | Habock et al. |
| 3,793,905 A | 2/1974 | Black et al. |
| 3,812,378 A | 5/1974 | Coman |
| 3,898,439 A | 8/1975 | Reed et al. |
| 3,951,008 A | 4/1976 | Schneider et al. |
| 4,044,550 A | 8/1977 | Vermilye |
| 4,069,424 A | 1/1978 | Burkett |
| 4,144,421 A | 3/1979 | Sakai |
| 4,380,146 A | 4/1983 | Yannone et al. |
| 4,598,551 A | 7/1986 | Dimitroff, Jr. et al. |
| 4,627,234 A | 12/1986 | Schuh |
| 4,669,893 A | 6/1987 | Chalaire et al. |
| 4,702,273 A | 10/1987 | Allen, Jr. et al. |
| 4,713,985 A | 12/1987 | Ando |
| 4,733,529 A | 3/1988 | Nelson et al. |
| 4,854,120 A | 8/1989 | Nelson et al. |
| 4,979,362 A | 12/1990 | Vershure, Jr. |
| 4,979,365 A | 12/1990 | Baker |
| 5,103,629 A | 4/1992 | Mumford et al. |
| 5,123,239 A | 6/1992 | Rodgers |
| 5,127,220 A | 7/1992 | Jesrai et al. |
| 5,174,109 A | 12/1992 | Lampe |
| 5,184,458 A | 2/1993 | Lampe et al. |
| 5,201,798 A | 4/1993 | Hogan |
| 5,349,814 A | 9/1994 | Ciokajlo et al. |
| 5,463,865 A | 11/1995 | Smith |
| 6,146,090 A | 11/2000 | Schmidt |
| 6,168,377 B1 | 1/2001 | Wolfe et al. |
| 6,190,127 B1 | 2/2001 | Schmidt |
| 6,305,156 B1 | 10/2001 | Lui |
| 6,318,958 B1 | 11/2001 | Giesler et al. |
| 6,478,534 B2 | 11/2002 | Bangert et al. |
| 6,498,978 B2 | 12/2002 | Leamy et al. |
| 6,517,314 B1 | 2/2003 | Burnett et al. |
| 6,558,118 B1 | 5/2003 | Brisson et al. |
| 6,681,579 B2 | 1/2004 | Lane et al. |
| 6,762,512 B2 | 7/2004 | Nelson |
| 6,884,027 B2 | 4/2005 | Faulkner |
| 6,935,836 B2 | 8/2005 | Ress, Jr. et al. |
| 7,104,072 B2 | 9/2006 | Thompson |
| 7,133,801 B2 | 11/2006 | Song |
| 7,409,319 B2 | 8/2008 | Kant et al. |
| 7,428,819 B2 | 9/2008 | Cataldi et al. |
| 7,507,070 B2 | 3/2009 | Jones |
| 7,513,119 B2 | 4/2009 | Zielinski et al. |
| 7,543,439 B2 | 6/2009 | Butt et al. |
| 7,587,133 B2 | 9/2009 | Franke et al. |
| 7,742,881 B2 | 6/2010 | Muralidharan et al. |
| 7,770,400 B2 | 8/2010 | Iasillo et al. |
| 7,909,566 B1 | 3/2011 | Brostmeyer |
| 7,972,105 B2 | 7/2011 | Dejoris et al. |
| 8,090,456 B2 | 1/2012 | Karpman et al. |
| 8,291,715 B2 | 10/2012 | Libera et al. |
| 8,306,776 B2 | 11/2012 | Ihara et al. |
| 8,744,634 B2 | 6/2014 | Purani et al. |
| 8,770,913 B1 | 7/2014 | Negron et al. |
| 8,776,530 B2 | 7/2014 | Shirooni et al. |
| 8,820,046 B2 | 9/2014 | Ross et al. |
| 8,918,264 B2 | 12/2014 | Jegu et al. |
| 9,046,111 B2 | 6/2015 | Harvey et al. |
| 9,086,018 B2 | 7/2015 | Winston et al. |
| 9,103,284 B2 | 8/2015 | Erickson et al. |
| 9,121,309 B2 | 9/2015 | Geiger |
| 9,732,762 B2 | 8/2017 | Duong et al. |
| 10,125,690 B2 | 11/2018 | Zaccaria et al. |
| 2002/0173897 A1 | 11/2002 | Leamy et al. |
| 2003/0145603 A1 | 8/2003 | Reed et al. |
| 2004/0000656 A1 | 1/2004 | Wiggins et al. |
| 2004/0131138 A1 | 7/2004 | Correia et al. |
| 2004/0231334 A1 | 11/2004 | Yamanaka et al. |
| 2007/0234738 A1 | 10/2007 | Borcea |
| 2009/0301053 A1 | 12/2009 | Geiger |
| 2010/0085676 A1 | 4/2010 | Wilfert |
| 2010/0095791 A1 | 4/2010 | Galloway |
| 2010/0132365 A1 | 6/2010 | Labala |
| 2010/0293961 A1 | 11/2010 | Tong et al. |
| 2010/0326085 A1 | 12/2010 | Veilleux |
| 2011/0077783 A1 | 3/2011 | Karpman et al. |
| 2011/0146276 A1 | 6/2011 | Sathyanarayana et al. |
| 2011/0153295 A1 | 6/2011 | Yerramalla et al. |
| 2011/0296843 A1 | 12/2011 | Lawson, Jr. |
| 2012/0240591 A1 | 9/2012 | Snider et al. |
| 2012/0266601 A1 | 10/2012 | Miller |
| 2012/0266606 A1 | 10/2012 | Zeiner et al. |
| 2013/0031912 A1 | 2/2013 | Finney et al. |
| 2013/0091850 A1 | 4/2013 | Francisco |
| 2013/0101391 A1 | 4/2013 | Szwedowicz et al. |
| 2013/0251501 A1 | 9/2013 | Araki et al. |
| 2014/0123673 A1 | 5/2014 | Mouze et al. |
| 2014/0154087 A1 | 6/2014 | Kirchner et al. |
| 2014/0199157 A1 | 7/2014 | Haerms et al. |
| 2014/0233089 A1 | 8/2014 | Fermann et al. |
| 2014/0241878 A1 | 8/2014 | Herrig et al. |
| 2014/0271152 A1 | 9/2014 | Rodriguez |
| 2014/0283527 A1 | 9/2014 | Ling et al. |
| 2014/0301820 A1 | 10/2014 | Lohse et al. |
| 2014/0318144 A1 | 10/2014 | Lazzeri et al. |
| 2014/0334927 A1 | 11/2014 | Hammerum |
| 2014/0366546 A1 | 12/2014 | Bruno et al. |
| 2014/0373518 A1 | 12/2014 | Manneville et al. |
| 2014/0373532 A1 | 12/2014 | Diemer et al. |
| 2014/0373533 A1 | 12/2014 | Jensen et al. |
| 2014/0373552 A1 | 12/2014 | Zaccaria et al. |
| 2014/0373553 A1 | 12/2014 | Zaccaria et al. |
| 2014/0373554 A1 | 12/2014 | Pech et al. |
| 2015/0016949 A1 | 1/2015 | Smith |
| 2015/0096359 A1 | 4/2015 | Catt |
| 2015/0115608 A1 | 4/2015 | Draper |
| 2015/0121874 A1 | 5/2015 | Yoshida et al. |
| 2015/0128592 A1 | 5/2015 | Filiputti et al. |
| 2015/0159625 A1 | 6/2015 | Hawdwicke, Jr. et al. |
| 2015/0167553 A1 | 6/2015 | Nesdill et al. |
| 2016/0332736 A1 | 11/2016 | Parmentier et al. |
| 2016/0348588 A1 | 12/2016 | Ross et al. |
| 2017/0016399 A1 | 1/2017 | Bedrine et al. |
| 2017/0233089 A1* | 8/2017 | Zaccaria ............... B64D 31/12 60/778 |
| 2017/0234235 A1 | 8/2017 | Pech |
| 2017/0234238 A1 | 8/2017 | Schwarz et al. |
| 2017/0342908 A1 | 11/2017 | Hon et al. |
| 2018/0022463 A1 | 1/2018 | Teicholz et al. |
| 2018/0022464 A1 | 1/2018 | Gelwan et al. |
| 2018/0022465 A1 | 1/2018 | Gelwan et al. |
| 2018/0023413 A1 | 1/2018 | Chowdhury et al. |
| 2018/0023479 A1 | 1/2018 | Clauson et al. |
| 2018/0023484 A1 | 1/2018 | Gelwan et al. |
| 2018/0045122 A1 | 2/2018 | Veilleux |
| 2018/0094588 A1 | 4/2018 | Clauson et al. |

(56) References Cited

U.S. PATENT DOCUMENTS

| | | |
|---|---|---|
| 2018/0149090 A1 | 5/2018 | Maalouf et al. |
| 2018/0230946 A1 | 8/2018 | Virtue, Jr. et al. |
| 2020/0239151 A1 | 7/2020 | Gelwan et al. |

FOREIGN PATENT DOCUMENTS

| | | | |
|---|---|---|---|
| EP | 2514949 | A2 | 10/2012 |
| EP | 3205836 | A1 | 8/2017 |
| EP | 3205843 | A1 | 8/2017 |
| EP | 3205849 | A1 | 8/2017 |
| EP | 3205859 | A1 | 8/2017 |
| EP | 3208429 | A1 | 8/2017 |
| EP | 3273007 | A1 | 1/2018 |
| EP | 3273008 | A1 | 1/2018 |
| FR | 2933131 | | 1/2010 |
| GB | 717183 | | 10/1954 |
| GB | 1186375 | | 4/1970 |
| GB | 1374810 | | 11/1974 |
| GB | 2117842 | | 10/1983 |
| IN | 201408865 | | 5/2015 |
| JP | 2002371806 | | 12/2002 |
| JP | 2004036414 | | 2/2004 |
| WO | 9900585 | | 1/1999 |
| WO | 2013007912 | | 1/2013 |
| WO | 2014152701 | A1 | 9/2014 |
| WO | 2015030946 | | 3/2015 |
| WO | 2015145034 | A1 | 10/2015 |
| WO | 2016203157 | A1 | 12/2016 |

OTHER PUBLICATIONS

Calculation Method and Simulation of Air Bleeding Loss for Aircraft Start System; San Mai Su, et al., 2018 37th Chinese Control Conference (CCC); pp. 1764-1769; IEEE Conference; year 2018.

EP Application No. 17199896.6 Office Action dated Dec. 11, 2018, 3 pages.

EP Application No. 17200204.0 Extended EP Search Report dated May 15, 2018, 6 pages.

European Search Report for Application No. EP17194050, dated Feb. 8, 2018 (6 pp.).

Extended European Search Report for Application No. 17181728.1-1607 dated Dec. 21, 2017 (8 pp.).

Extended European Search Report for Application No. 17181931.1-1607 dated Dec. 8, 2017 (7 pp.).

Extended European Search Report for Application No. 17181979.0-1607 dated Dec. 13, 2017 (8 pp.).

Extended European Search Report for Application No. 17182126.7-1007, dated Feb. 16, 2018 (7 pp.).

Extended European Search Report for Application No. 17182145.7-1607 dated Dec. 7, 2017 (7 pp.).

Extended European Search Report for Application No. 17182405.5-1607 dated Dec. 18, 2017 (7 pp.).

Extended European Search Report for Application No. 17199896.6-1006, dated Mar. 7, 2018 (11 pp.).

Second law analysis of extra power requirements for a cascade of industrial compressors; S. Strevell et al, IECEC-97 Proceedings of the Thirty-Second Intersociety Energy Conversion Eng. Cont (Cat No. 97CH6203); vol. 3, pp. 1581-1586; IEE Conf; year 1997.

* cited by examiner

PRE-START MOTORING SYNCHRONIZATION FOR MULTIPLE ENGINES

CROSS-REFERENCE TO RELATED APPLICATIONS

This application is a continuation of U.S. patent application Ser. No. 15/216,233 filed Jul. 21, 2016, the disclosure of which is incorporated by reference herein in its entirety.

BACKGROUND

This disclosure relates to gas turbine engines, and more particularly to systems and methods for synchronizing timing of starter use during multi-engine motoring of gas turbine engines in a pre-start motoring sequence.

Gas turbine engines are used in numerous applications, one of which is for providing thrust to an airplane. When the gas turbine engine of an airplane has been shut off for example, after an airplane has landed at an airport, the engine is hot and due to heat rise, the upper portions of the engine will be hotter than lower portions of the engine. When this occurs thermal expansion may cause deflection of components of the engine which may result in a "bowed rotor" condition. If a gas turbine engine is in such a bowed rotor condition it is undesirable to restart or start the engine.

One approach to mitigating a bowed rotor condition is to use a starter system to drive rotation of a spool within the engine for an extended period of time at a speed below which a resonance occurs (i.e., a critical speed or frequency) that may lead to damage when a sufficiently large bowed rotor condition is present. Motoring is typically performed separately for each engine at different times based on an engine specific amount of time to clear a bowed rotor condition. Timing variations can be distracting to flight crews and raise unwarranted concerns of potential maintenance issues due to variations between the motoring demands of each engine.

BRIEF DESCRIPTION

In an embodiment, a system for pre-start motoring control for multiple engines of an aircraft is provided. The system includes a first engine starting system of a first engine and a controller. The controller is operable to control a motoring time of the first engine starting system relative to one or more other engine starting systems of one or more other engines of the aircraft by adjusting the motoring time of the first engine starting system within a tolerance of the motoring time of the one or more other engine starting systems in a pre-start motoring sequence.

In addition to one or more of the features described above, or as an alternative to any of the foregoing embodiments, further embodiments may include where the motoring time of the first engine starting system is controlled relative to the one or more other engine starting systems by comparing a first value of the motoring time of the first engine starting system with a first value of the motoring time of the one or more other engine starting systems and selecting a relative value as the motoring time for the first engine starting system and the one or more other engine starting systems.

In addition to one or more of the features described above, or as an alternative to any of the foregoing embodiments, further embodiments may include where the controller provides the first value of the motoring time of the first engine starting system to one or more other controllers and receives the first value of the motoring time of the one or more other engine starting systems from the one or more other controllers.

In addition to one or more of the features described above, or as an alternative to any of the foregoing embodiments, further embodiments may include where the controller maintains the motoring time of the first engine starting system as the first value of the motoring time of the first engine starting system based on determining that the first value of the motoring time of the first engine starting system is greater than or equal to the first value of the motoring time of the one or more other engine starting systems.

In addition to one or more of the features described above, or as an alternative to any of the foregoing embodiments, further embodiments may include where the pre-start motoring sequence comprises simultaneous motoring of the first engine and the one or more other engines.

In addition to one or more of the features described above, or as an alternative to any of the foregoing embodiments, further embodiments may include where the pre-start motoring sequence comprises sequential motoring of the first engine and the one or more other engines.

In addition to one or more of the features described above, or as an alternative to any of the foregoing embodiments, further embodiments may include where the controller is operable to control the first engine starting system to maintain a starting spool speed of the first engine below a resonance speed during the motoring time of the first engine starting system.

In addition to one or more of the features described above, or as an alternative to any of the foregoing embodiments, further embodiments may include where the controller is further operable to validate the motoring time of the one or more other engine starting systems and range limit the motoring time of the first engine starting system prior to performing motoring of the first engine during the pre-start motoring sequence.

According to another embodiment, a system of an aircraft includes a first engine system and a second engine system. The first engine system includes a first gas turbine engine, a first starter, and a first controller operable to control the first starter to perform motoring of the first gas turbine engine in a pre-start motoring sequence. The second engine system includes a second gas turbine engine, a second starter, and a second controller operable to control the second starter to perform motoring of the second gas turbine engine in the pre-start motoring sequence. A motoring time of the first gas turbine engine is controlled within a tolerance of a motoring time of the second gas turbine engine by adjusting the motoring time of the first gas turbine engine relative to the second gas turbine engine.

In addition to one or more of the features described above, or as an alternative to any of the foregoing embodiments, further embodiments may include where at least one engine control interface coordinates the motoring time of the first gas turbine engine relative to the motoring time of the second gas turbine engine.

In addition to one or more of the features described above, or as an alternative to any of the foregoing embodiments, further embodiments may include where the first controller and the second controller exchange first values of the motoring time of the first gas turbine engine and the second gas turbine engine and select a relative value as the motoring time of the first gas turbine engine and the second gas turbine engine.

In addition to one or more of the features described above, or as an alternative to any of the foregoing embodiments, further embodiments may include where the pre-start motoring sequence includes simultaneous motoring of the first gas turbine engine and the second gas turbine engine.

In addition to one or more of the features described above, or as an alternative to any of the foregoing embodiments, further embodiments may include where the pre-start motoring sequence includes sequential motoring of the first gas turbine engine and the second gas turbine engine.

In addition to one or more of the features described above, or as an alternative to any of the foregoing embodiments, further embodiments may include where the motoring time of the first gas turbine engine and the second gas turbine engine is validated and range limited prior to performing motoring of the first gas turbine engine and the second gas turbine engine during the pre-start motoring sequence.

According to a further embodiment, a method for pre-start motoring control for multiple engines of an aircraft is provided. The method includes determining, by a controller, a motoring time of a first engine starting system of a first engine. The controller compares the motoring time of the first engine starting system with a motoring time of one or more other engine starting systems of one or more other engines of the aircraft. The motoring time of the first engine starting system is controlled within a tolerance of the motoring time of the one or more other engine starting systems by adjusting the motoring time of the first engine starting system relative to the one or more other engine starting systems in a pre-start motoring sequence.

In addition to one or more of the features described above, or as an alternative to any of the foregoing embodiments, further embodiments may include validating the motoring time of the one or more other engine starting systems, and range limiting the motoring time of the first engine starting system prior to performing motoring of the first engine during the pre-start motoring sequence.

A technical effect of the apparatus, systems and methods is achieved by synchronizing a motoring time to perform multi-engine motoring for bowed rotor mitigation of gas turbine engines as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
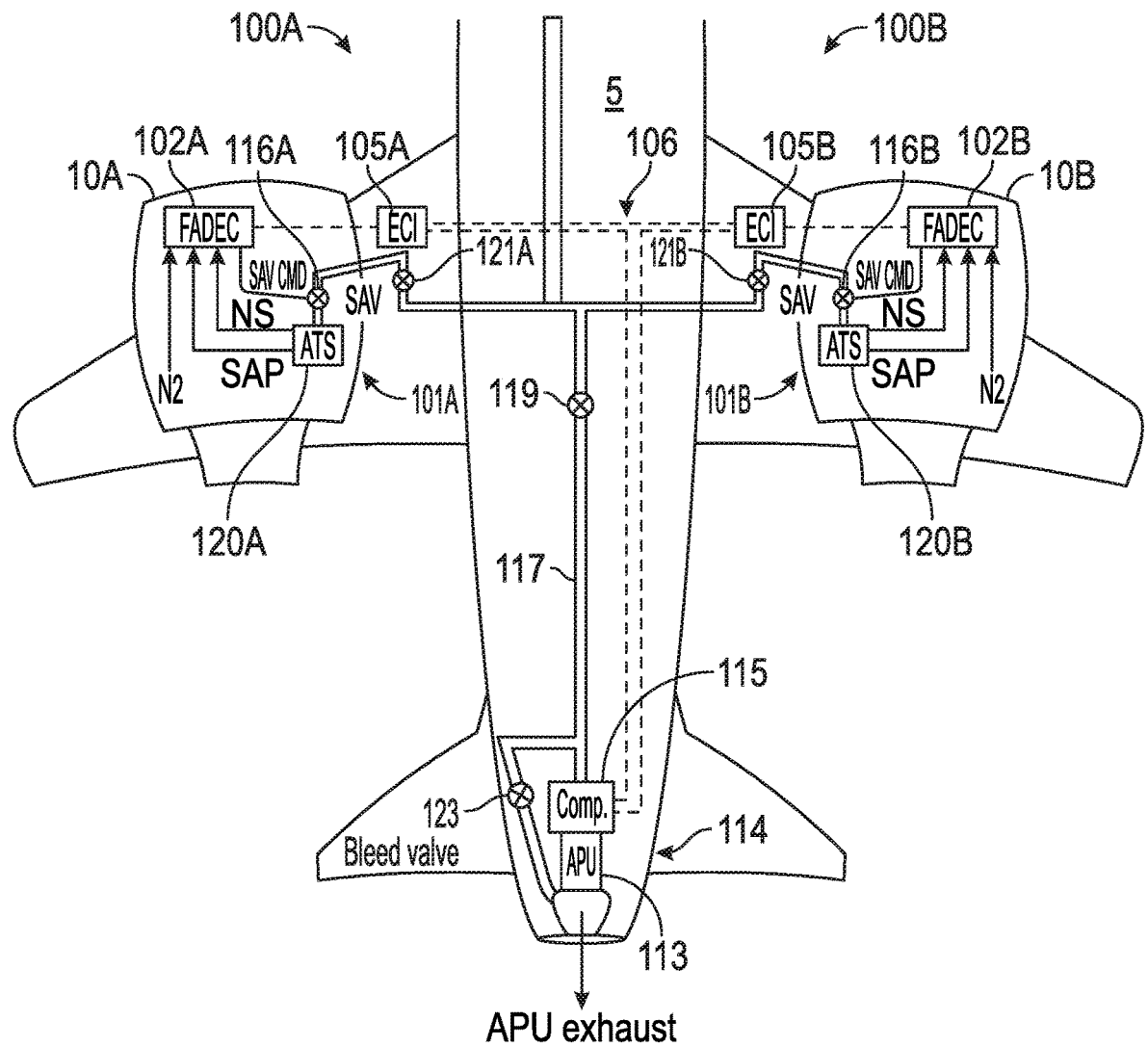
FIG. 1 is a schematic illustration of an aircraft engine starting system in accordance with an embodiment of the disclosure.

Various embodiments of the present disclosure are related to a bowed rotor start mitigation system in gas turbine engines. Embodiments can include using a starter air valve to control a rotor speed of a starting spool of a gas turbine engine to mitigate a bowed rotor condition using a dry motoring process for multiple engines. During dry motoring, the starter air valve can be actively adjusted to deliver air pressure (i.e., compressed air) from an air supply to an air turbine starter of an engine starting system that controls starting spool rotor speed. Dry motoring may be performed by running an engine starting system at a lower speed with a longer duration than typically used for engine starting while dynamically adjusting the starter air valve to maintain the rotor speed and/or follow a dry motoring profile. The critical rotor speed refers to a major resonance speed where, if the temperatures are unhomogenized, the combination of a bowed rotor and similarly bowed casing and the resonance would lead to high amplitude oscillation in the rotor and high rubbing of blade tips on one side of the rotor, especially in the high pressure compressor if the rotor is straddle-mounted.

A dry motoring profile for dry motoring can be selected based on various parameters, such as a modeled temperature value of the gas turbine engine used to estimate heat stored in the engine core when a start sequence is initiated and identify a risk of a bowed rotor. The modeled temperature value alone or in combination with other values (e.g., measured temperatures) can be used to calculate a bowed rotor risk parameter. For example, the modeled temperature can be adjusted relative to an ambient temperature when calculating the bowed rotor risk parameter. The bowed rotor risk parameter may be used to take a control action to mitigate the risk of starting the gas turbine engine with a bowed rotor. The control action can include dry motoring consistent with the dry motoring profile. In some embodiments, a targeted rotor speed profile of the dry motoring profile can be adjusted as dry motoring is performed. The dry motoring profile can be configured to oscillate the motoring speed in an alternating pattern between multiple engines such that rotor speed of each engine stays below the critical rotor speed while not completely stopping rotation during dry motoring. For instance, in a two engine system, the motoring systems alternate between receiving more compressed air and less compressed air in a staggered pattern such that one engine is accelerating while the other engine is decelerating to reduce loading on a compressed air source that drives the motoring of both engines. In some embodiments, each engine has a baseline dry motoring profile that can be time shifted on an engine basis to achieve an alternating pattern. Dry motoring profiles can be formatted on a rotor speed basis (e.g., N2), a starter speed basis (e.g., NS), a valve position basis, and/or using one or more other control parameters.

In alternate embodiments, electric starters are used in motoring systems to perform dry motoring. The electric starters may alternate in drawing electric current from an electric power source such that one engine is accelerating while the other engine is decelerating to reduce loading on the electric power source that drives the motoring of both engines. Dry motoring profiles can be defined on an electrical current draw basis.

Regardless of whether pneumatic or electric starting is used, embodiments can exchange motoring times (e.g., total expected time to perform motoring at one or more target speeds or following a dry motoring profile) to synchronize timing values such that all engines have a same amount of motoring time. A largest motoring time computed is used for all engines to selectively extend the actual motoring time of one or more engines regardless of whether motoring is performed simultaneously or sequentially between the engines.

A full authority digital engine control (FADEC) system or other system may send a message to the cockpit to inform the crew of an extended time start time due to bowed rotor mitigation actions prior to completing an engine start sequence. If an engine is in a ground test or in a test stand, a message can be sent to the test stand or cockpit based on the control-calculated risk of a bowed rotor. A test stand crew can be alerted regarding a requirement to keep the starting spool of the engine to a speed below the known resonance speed of the rotor in order to homogenize the temperature of the rotor and the casings about the rotor which also are distorted by temperature non-uniformity.

In order to further reduce total start time, embodiments control dry motoring of multiple engines at the same time. Respective FADECs for each engine can provide parameters to one or more engine control interfaces including sensed temperatures and other values that may impact timing decisions for starter use for each engine. An engine control interface that receives the parameters can determine present conditions with respect to an operating envelope of a power source (e.g., compressed air or electric) and the starting system of each engine based on predetermined performance constraints, engine drag, and/or parasitic factors. The engine control interface or other controller can determine a largest motoring time needed for each engine and extend the planned motoring time for one or more engines initially having a lesser motoring time such that all engines of the same aircraft perform motoring for a same amount of time during a pre-start motoring sequence.

Referring now to FIG. 1, a schematic illustration of an aircraft 5 is depicted with a pair of engine systems 100A, 100B. Engine systems 100A, 100B include gas turbine engines 10A, 10B and engine starting systems 101A, 101B respectively. Engine systems 100A, 100B also include FADECs 102A, 102B to control gas turbine engines 10A, 10B and engine starting systems 101A, 101B. FADECs 102A, 102B may generally be referred to as controllers. FADECs 102A, 102B can communicate with respective engine control interfaces 105A, 105B using a digital communication bus 106. The engine control interfaces 105A, 105B can buffer engine system communication from aircraft level communication. Although depicted separately in FIG. 1, in some embodiments the engine control interfaces 105A, 105B are integrated with the FADECs 102A, 102B. The engine control interfaces 105A, 105B may also be referred to as controllers when configured to make mode selection determinations to perform single engine or multi-engine dry motoring for the aircraft 5.

In an embodiment, the FADECs 102A, 102B and engine control interfaces 105A, 105B may each include memory to store instructions that are executed by one or more processors on one or more channels. The executable instructions may be stored or organized in any manner and at any level of abstraction, such as in connection with a controlling and/or monitoring operation of the gas turbine engines 10A, 10B of FIG. 1. The one or more processors can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form.

In the example of FIG. 1, an auxiliary power unit (APU) 113 and compressor 115 provide a compressed air source 114 to drive air turbine starters 120A, 120B of engine starting systems 101A, 101B. The APU 113 can also produce electric power. Compressed air from the compressed air source 114 is routed through ducts 117 and air starter valves 116A, 116B to the air turbine starters 120A, 120B. Various shutoff valves can also be included in ducts 117, such as a main shutoff valve 119 and engine shutoff valves 121A, 121B. One or more bleed valves 123 can be used to release compressed air from the ducts 117. According to an alternate embodiment, the compressed air source 114 may be a ground cart, cross engine bleed or other source of air.

In some cases, dry motoring can be performed simultaneously for engine systems 100A, 100B, where compressed air from the compressed air source 114 is provided to both air turbine starters 120A, 120B. The FADECs 102A, 102B and/or the engine control interfaces 105A, 105B can be configured with control laws to control a motoring speed for each of the gas turbine engines 10A, 10B and maintain the motoring speed below a threshold level (i.e., the critical rotor speed) for the engine system 100A, 100B while performing dry motoring based on compressed air source 114. In embodiments, FADECs 102A, 102B can observe various engine parameters and starting system parameters to actively control dry motoring and prevent fault conditions from damaging the gas turbine engines 10A, 10B. For example, FADECs 102A, 102B can observe engine speeds (N2) of gas turbine engines 10A, 10B and may receive starter system parameters such as starter speeds (NS) and/or starter air pressures (SAP). In embodiments, FADECs 102A, 102B can adjust starter air valves 116A, 116B based on commands received from the engine control interfaces 105A, 105B to balance loading on the compressed air source 114. The total motoring time for gas turbine engines 10A, 10B can be synchronized such that motoring is performed for a same amount of time for both gas turbine engines 10A, 10B in a pre-start motoring sequence.

To further enhance control aspects, the FADECs 102A, 102B can provide either or both of the engine control interfaces 105A, 105B with engine data including parameters that directly or indirectly modify an aspect of the compressed air received at the starter air valves 116A, 116B. Engine data can be sent on the digital communication bus 106 to either or both of the engine control interfaces 105A, 105B to make relative timing control determinations. Engine data can also or alternatively be exchanged on an alternate link (e.g., cross engine bus 106A of FIG. 2) between FADECs 102A, 102B for relative timing control. Engine data may include fault information, such as a detected failure of the starter air valves 116A, 116B and/or the air turbine starters 120A, 120B. Present condition information and/or commands included in the engine data can allow the engine control interfaces 105A, 105B to track and/or predict events that will impact available compressed air for dry motoring at each of the engine starting systems 101A, 101B. For example, at least one temperature of gas turbine engines 10A, 10B, such as a measured core engine temperature or an oil temperature, can be used to determine current conditions and select timing parameters shared by the two or more engines 10A, 10B. Additional performance parameters, such as an ambient air temperature and/or an ambient pressure, can also be used to determine relative control timing between two or more engines 10A, 10B. For instance, ambient temperature can be used for temperature comparison/normalization and ambient pressure can be used to adjust for altitude effects. When sufficient margin is present, a greater amount of overlap may be commanded where both starter air valves 116A, 116B are simultaneously open. Where reduced compressed air source capacity is available, only one of the starter air valves 116A, 116B may be open at a time while motoring is active. Where no fault condition exists, the total motoring time for each of the two or more engines 10A, 10B is set to the same value by extending motoring for any engine 10A, 10B that would otherwise complete early.

Although FIG. 1 depicts one example configuration, it will be understood that embodiments as described herein can cover a wide range of configurations, such as a four engine system. Further, the compressed air source 114 can include multiple sources other than APU 113 and compressor 115, such as a ground cart or cross engine bleed air. The compressed air source 114 is an example of a power source for engine starting systems 101A, 101B. In alternate embodiments, a power source can be electric power when electric starters are used in place of air turbine starters 120A, 120B.

Figure 2:
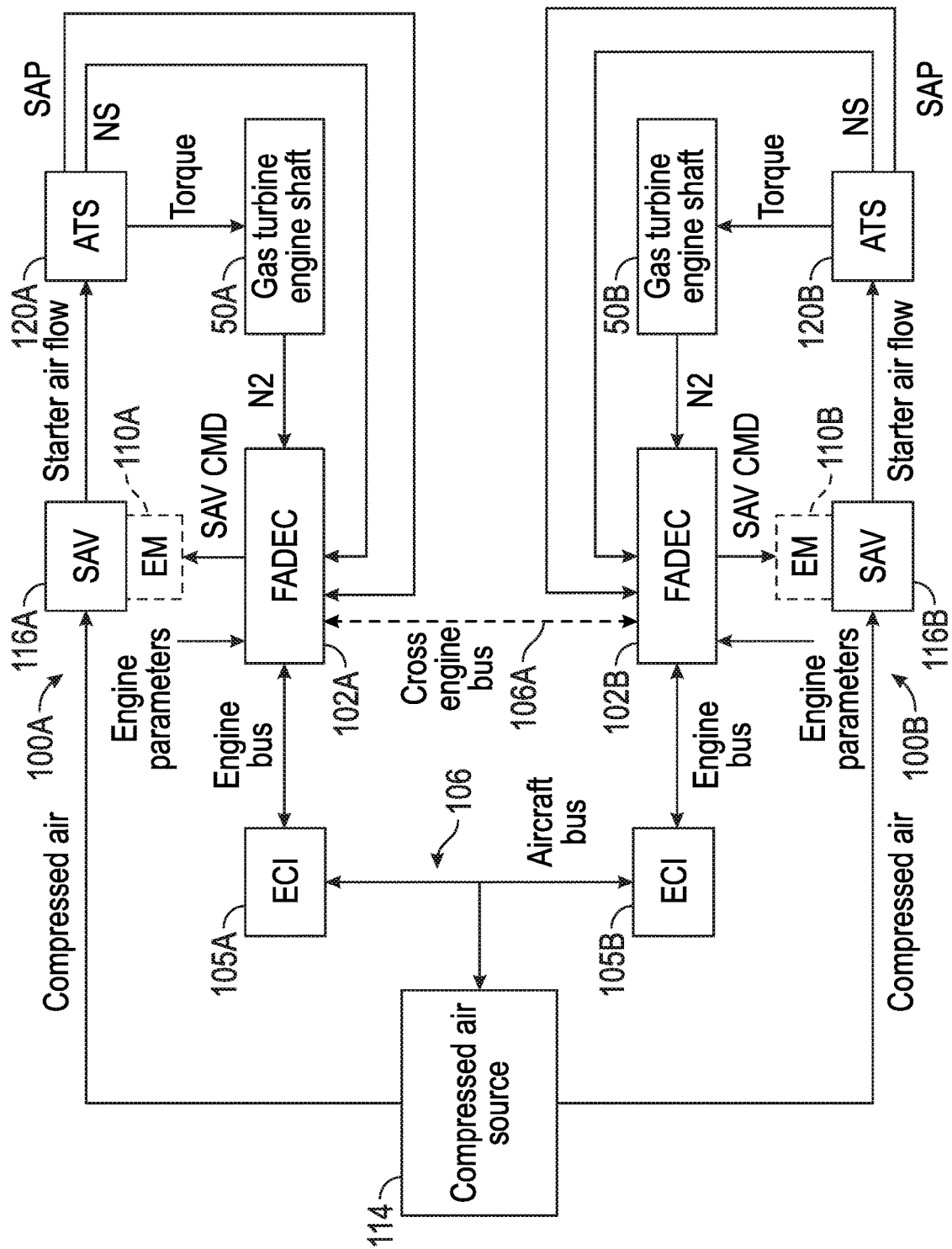
FIG. 2 is another schematic illustration of an aircraft engine starting system in accordance with an embodiment of the disclosure.

Turning now to FIG. 2, a schematic of engine systems 100A, 100B and engine starting systems 101A, 101B for the gas turbine engines 10A, 10B of FIG. 1 are depicted according to an embodiment. In the example of FIG. 2, the digital communication bus 106 can include an aircraft, engine, and/or test stand communication bus to interface with FADECs 102A, 102B, engine control interfaces 105A, 105B, aircraft controls, e.g., a cockpit, various onboard computer systems, and/or a test stand (not depicted). In some embodiments, a cross engine bus 106A provides a link between FADECs 102A, 102B as a lower latency communication path between engine systems 100A, 100B, for instance, by avoiding shared communication scheduling conflicts with other aircraft level systems. Either or both channels of FADECs 102A, 102B can drive on and off commands to respective electromechanical devices 110A, 110B coupled to starter air valves 116A, 116B to achieve a partially open position of the starter air valves 116A, 116B to control a flow of compressed air from compressed air source 114 (e.g., APU 113 and compressor 115 of FIG. 1) as a starter air flow to air turbine starters 120A, 120B during dry motoring. The air turbine starters 120A, 120B output torque to drive rotation of respective gas turbine engine shafts 50A, 50B of starting spools of the gas turbine engines 10A, 10B.

The FADECs 102A, 102B can monitor engine speed (N2), starter speed (NS), starter air pressure (SAP), and/or other engine parameters to determine an engine operating state and control the starter air valves 116A, 116B. Thus, the FADECs 102A, 102B can each establish a control loop with respect to a motoring speed (N2 and/or NS) and/or starter air pressure to adjust positioning of the starter air valves 116A, 116B. The FADECs 102A, 102B can also transmit engine data on digital communication bus 106 to engine control interfaces 105A, 105B, including present conditions and commands of each engine system 100A, 100B that may impact characteristics of the compressed air available at the starter air valves 116A, 116B. The engine control interfaces 105A, 105B can supply the FADECs 102A, 102B with coordination commands to adjust timing of the FADECs 102A, 102B such that motoring time is the same for both engines 10A, 10B regardless of whether motoring is performed simultaneously or sequentially.

In some embodiments, the starter air valves 116A, 116B are discrete valves designed as on/off valves that are typically commanded to either fully opened or fully closed. However, there is a time lag to achieve the fully open position and the fully closed position. By selectively alternating an on-command time with an off-command time through the electromechanical devices 110A, 110B, intermediate positioning states (i.e., partially opened/closed) can be achieved. The FADECs 102A, 102B can modulate the on and off commands (e.g., as a duty cycle using pulse width modulation) to the electromechanical devices 110A, 110B to further open the starter air valves 116A, 116B and increase a rotational speed of the gas turbine engine shafts 50A, 50B. In an embodiment, the electromechanical devices 110A, 110B have a cycle time defined between an off-command to an on-command to the off-command that is at most half of a movement time for the starter air valves 116A, 116B to transition from fully closed to fully open. Pneumatic lines or mechanical linkage (not depicted) can be used to drive the starter air valves 116A, 116B between the open position and the closed position. The electromechanical devices 110A, 110B can each be a solenoid that positions the starter air valves 116A, 116B based on intermittently supplied electric power as commanded by the FADECs 102A, 102B. In an alternate embodiment, the electromechanical devices 110A, 110B are electric valves controlling muscle air to adjust the position of the starter air valves 116A, 116B as commanded by the FADECs 102A, 102B.

In an alternate embodiment, rather than using electromechanical devices 110A, 110B to achieve a partially open position of the starter air valves 116A, 116B, the starter air valves 116A, 116B can be variable position valves that are dynamically adjustable to selected valve angles by the FADECs 102A, 102B. When implemented as variable position valves, the starter air valves 116A, 116B can be continuous/infinitely adjustable and hold a commanded valve angle, which may be expressed in terms of a percentage open/closed and/or an angular value (e.g., degrees or radians). Performance parameters of the starter air valves 116A, 116B can be selected to meet dynamic response requirements. For example, in some embodiments, the starter air valves 116A, 116B each have a response rate of 0% to 100% open in less than 40 seconds. In other embodiments, the starter air valves 116A, 116B each have a response rate of 0% to 100% open in less than 30 seconds. In further embodiments, the starter air valves 116A, 116B each have a response rate of 0% to 100% open in less than 20 seconds.

In some embodiments, the FADECs 102A, 102B can each monitor a valve angle of the starter air valves 116A, 116B when valve angle feedback is available. The FADECs 102A, 102B can establish an outer control loop with respect to motoring speed and an inner control loop with respect to the valve angle of the starter air valves 116A, 116B. Valve angle feedback and/or valve commands can be included in the cross engine data exchanged between the FADECs 102A, 102B and may be sent to the engine control interfaces 105A, 105B. In some embodiments, the engine control interfaces 105A, 105B establish a further outer control loop that adjusts timing of control actions of the FADECs 102A, 102B relative to each other.

Figure 8:
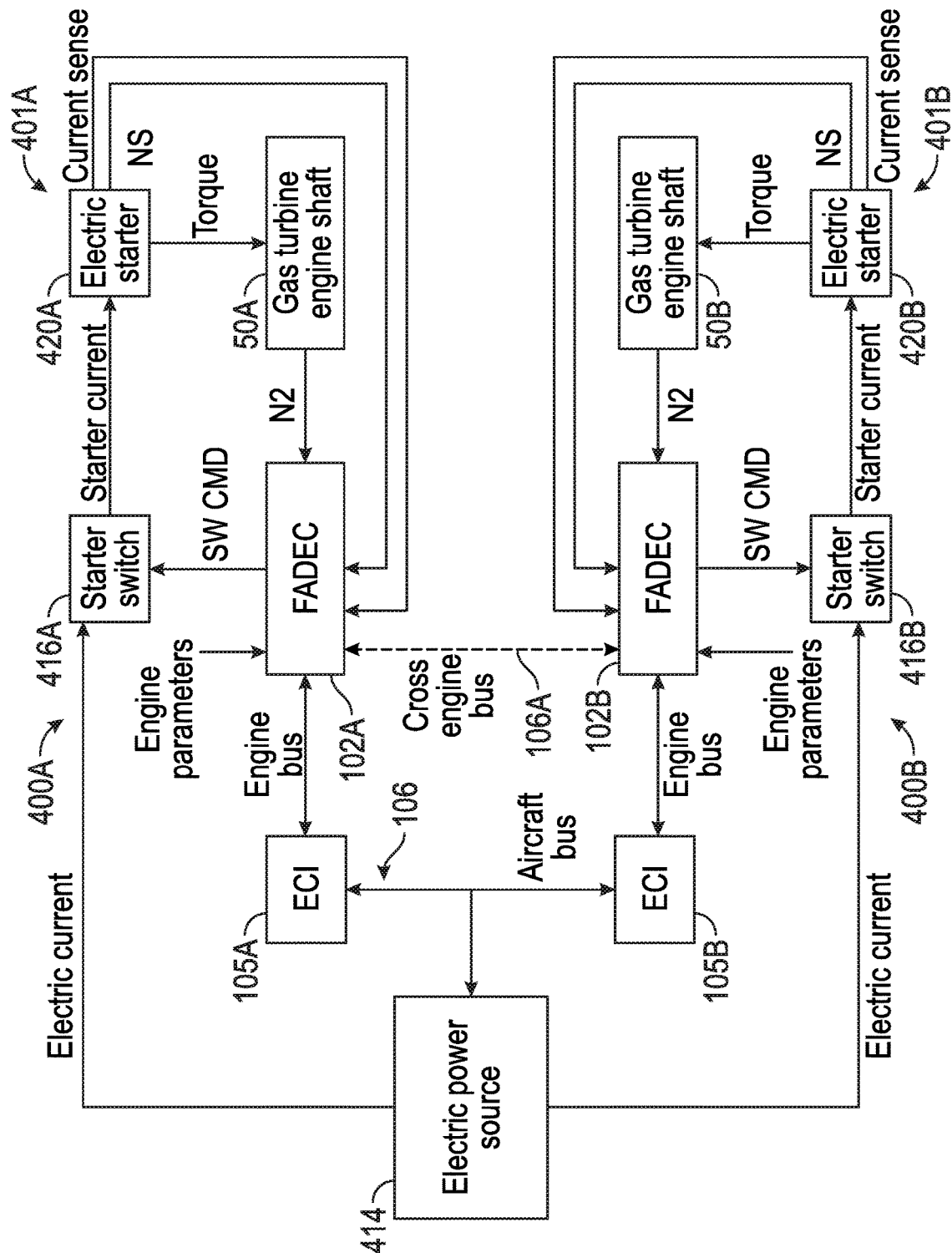
FIG. 8 is another schematic illustration of an aircraft engine starting system in accordance with an embodiment of the disclosure.

As a further alternative, FIG. 8 depicts a schematic of engine systems 400A, 400B and engine starting systems 401A, 401B for the gas turbine engines 10A, 10B of FIG. 1 according to an embodiment. In the example of FIG. 8, either or both channels of FADECs 102A, 102B can drive on and off commands to respective starter switches 416A, 416B to control a flow of electric current from electric power source 414 (e.g., electricity generated by APU 113 of FIG. 1, a stored energy source, a cross engine power supply, ground power, etc.) as a starter current to electric starters 420A, 420B during dry motoring. The electric starters 420A, 420B output torque to drive rotation of respective gas turbine engine shafts 50A, 50B of starting spools of the gas turbine engines 10A, 10B.

The FADECs 102A, 102B can monitor engine speed (N2), starter speed (NS), current, and/or other engine parameters to determine an engine operating state and control the starter switches 416A, 416B. Thus, the FADECs 102A, 102B can each establish a control loop with respect to a motoring speed (N2 and/or NS) and/or current to adjust the state of the starter switches 416A, 416B. The FADECs 102A, 102B can also transmit engine data on digital communication bus 106 to engine control interfaces 105A, 105B, including present conditions and commands of each engine system 100A, 100B that may impact characteristics of the electric current available at the starter switches 416A, 416B. The engine control interfaces 105A, 105B can supply the FADECs 102A, 102B with coordination commands to adjust timing between the FADECs 102A, 102B such that motoring time is the same for both engines 10A, 10B regardless of whether motoring is performed simultaneously or sequentially.

Figure 3:
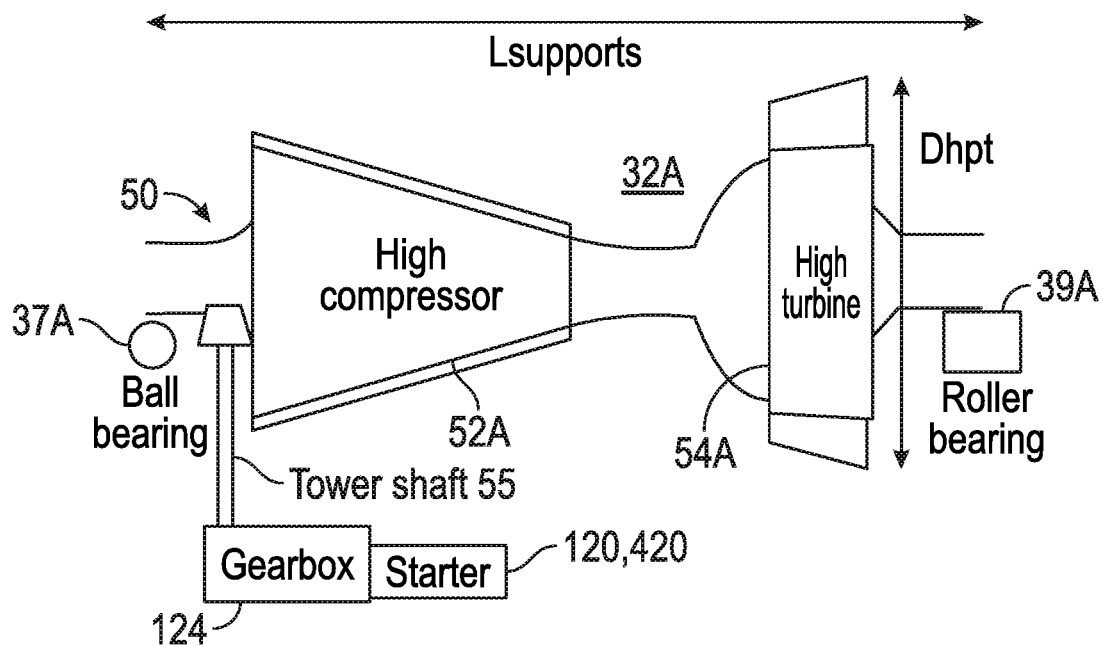
FIG. 3 is a schematic illustration of a high spool gas path with a straddle-mounted spool in accordance with an embodiment of the disclosure.
Figure 4:
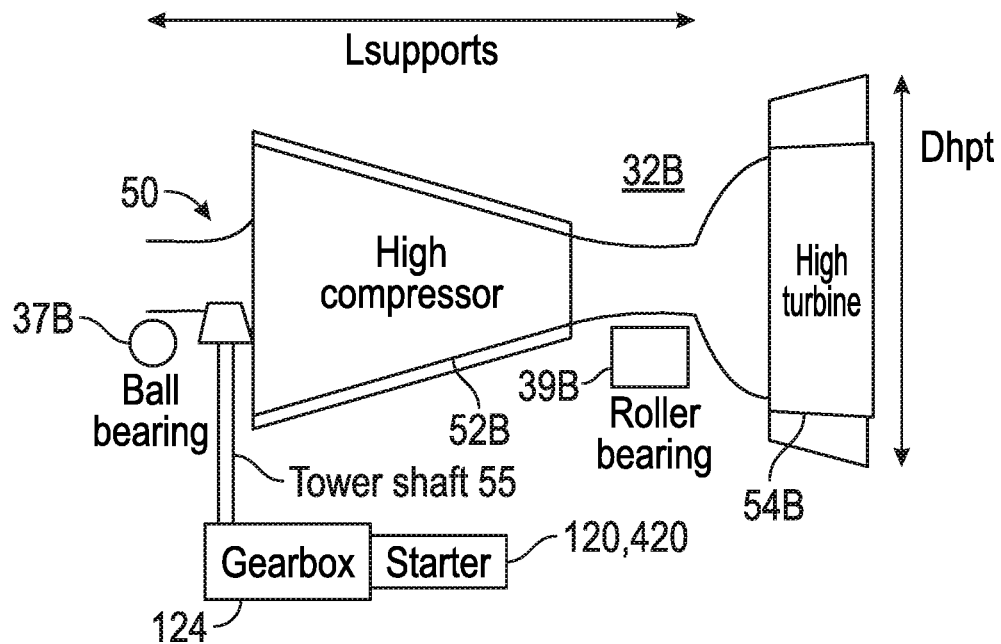
FIG. 4 is a schematic illustration of a high spool gas path with an overhung spool in accordance with an embodiment of the disclosure.

FIGS. 3 and 4 depict two example engine configurations of the gas turbine engines 10A, 10B of FIG. 1. FIG. 3 is an example of a straddle-mounted spool 32A as a starting spool configuration. This configuration places two bearing compartments 37A and 39A (which may include a ball bearing and a roller bearing respectively), outside of the plane of most of the compressor disks of high pressure compressor 52A and at outside at least one of the turbine disks of high pressure turbine 54A. In contrast with a straddle-mounted spool arrangement, other embodiments may be implemented using an over-hung mounted spool 32B as depicted in FIG. 4 as a starting spool configuration. In over-hung mounted spool 32B, a bearing compartment 37B is located forward of the first turbine disk of high pressure turbine 54B such that the high pressure turbine 54B is overhung, and it is physically located aft of its main supporting structure. The use of straddle-mounted spools has advantages and disadvantages in the design of a gas turbine, but one characteristic of the straddle-mounted design is that the span between the bearing compartments 37A and 39A is long, making the amplitude of the high spot of a bowed rotor greater and the resonance speed that cannot be transited prior to temperature homogenization is lower. For any thrust rating, the straddle mounted arrangement, such as straddle-mounted spool 32A, gives Lsupport/Dhpt values that are higher, and the over-hung mounted arrangement, such as overhung spool 32B, can be as much as 60% of the straddle-mounted Lsupport/Dhpt. Lsupport is the distance between bearings (e.g., between bearing compartments 37A and 39A or between bearing compartments 37B and 39B), and Dhpt is the diameter of the last blade of the high pressure turbine (e.g., high pressure turbine 54A or high pressure turbine 54B). As one example, a straddle-mounted engine starting spool, such as straddle-mounted spool 32A, with a roller bearing at bearing compartment 39A located aft of the high pressure turbine 54A may be more vulnerable to bowed rotor problems since the Lsupport/Dhpt ranges from 1.9 to 5.6.

FIGS. 3 and 4 also illustrate a starter as an air turbine starter 120 (e.g., air turbine starter 120A or 120B of FIGS. 1 and 2) or electric starter 420 (e.g., electric starter 420A or 420B of FIG. 8) interfacing through gearbox 124 via a tower shaft 55 with the straddle-mounted spool 32A proximate high compressor 52A and interfacing via tower shaft 55 with the overhung mounted spool 32B proximate high compressor 52B as part of a starting system. The straddle-mounted spool 32A and the over-hung mounted spool 32B are both examples of a starter spool having a gas turbine engine shaft 50 driven by the starter 120, 420, such as gas turbine engine shafts 50A, 50B driven by air turbine starters 120A, 120B of FIG. 2 or electric starters 420A, 420B of FIG. 8.

Figure 5:
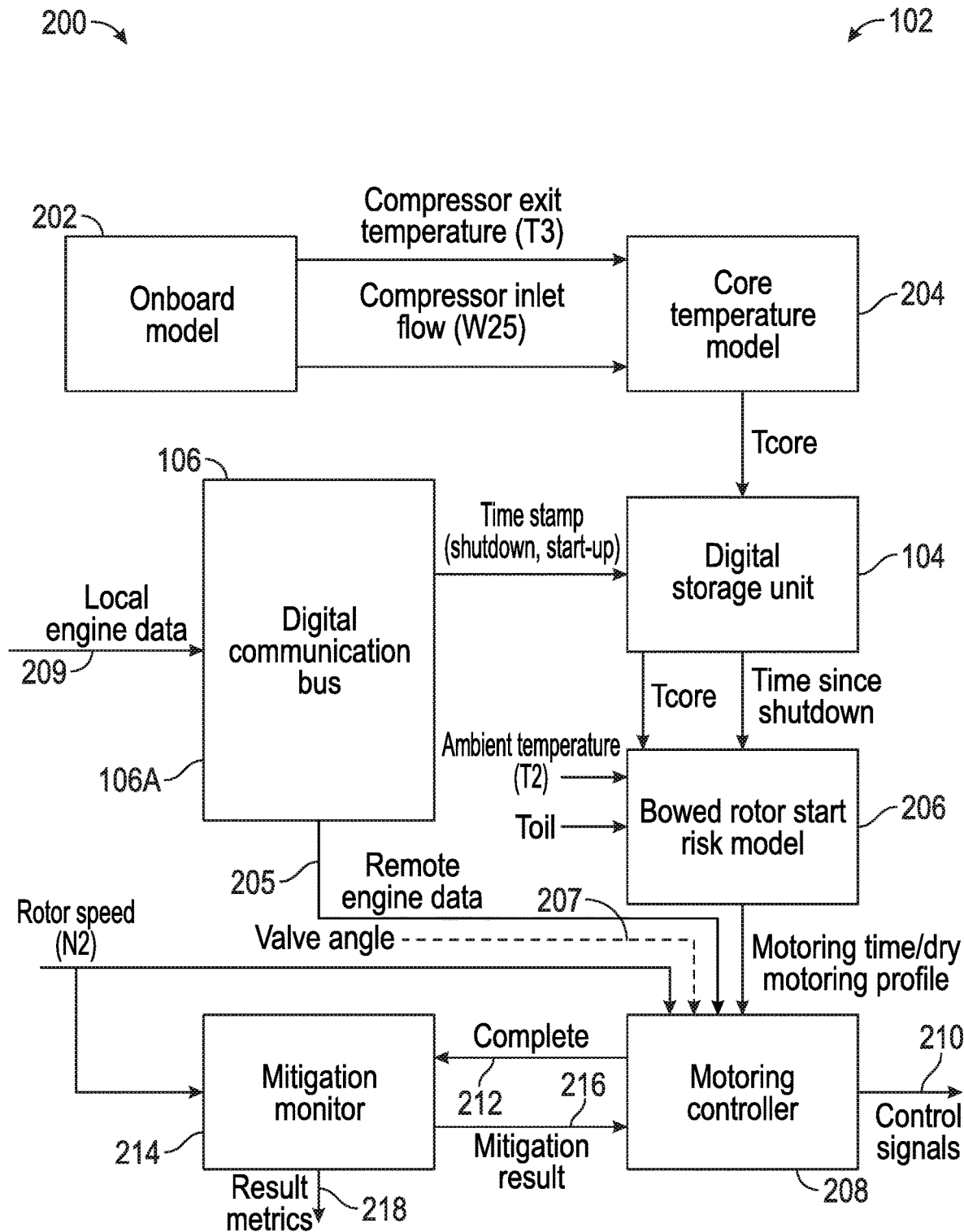
FIG. 5 is a block diagram of a system for bowed rotor start mitigation in accordance with an embodiment of the disclosure.

FIG. 5 is a block diagram of a system 200 for bowed rotor start mitigation that may control either of the starter air valves 116A, 116B of FIGS. 1 and 2 or the starter switches 416A, 416B of FIG. 8 via control signals 210 in accordance with an embodiment. The system 200 may also be referred to as a bowed rotor start mitigation system. In the example of FIG. 5, the system 200 includes an onboard model 202 operable to produce a compressor exit temperature $T_3$ and a compressor inlet flow $W_{25}$ of one of the gas turbine engines 10A, 10B of FIG. 1 for use by a core temperature model 204. The onboard model 202 is configured to synthesize or predict major temperatures and pressures throughout one of the gas turbine engines 10A, 10B of FIG. 1 beyond those sensed by sensors positioned about the gas turbine engines 10A, 10B. The onboard model 202 and core temperature model 204 are examples of a first thermal model and a second thermal model that may be separately implemented or combined as part of a controller 102 (e.g., FADECs 102A, 102B of FIG. 1).

Engine parameter synthesis is performed by the onboard model 202, and the engine parameter synthesis may be performed using the technologies described in U.S. Patent Publication No. 2011/0077783, the entire contents of which are incorporated herein by reference thereto. Of the many parameters synthesized by onboard model 202 at least two are outputted to the core temperature model 204, $T_3$, which is the compressor exit gas temperature of each gas turbine engine 10A, 10B and $W_{25}$, which is the air flow through the compressor. Each of these values are synthesized by onboard model 202 and inputted into the core temperature model 204 that synthesizes or provides a heat state ($T_{core}$) of each gas turbine engine 10A, 10B. $T_{core}$ can be determined by a first order lag or function of $T_3$ and a numerical value X (e.g., $f(T_3, X)$), wherein X is a value determined from a lookup table stored in memory of controller 102. Accordingly, X is dependent upon the synthesized value of $W_{25}$. In other words, $W_{25}$ when compared to a lookup table of the core temperature model 204 will determine a value X to be used in determining the heat state or $T_{core}$ of each gas turbine engine 10A, 10B. In one embodiment, the higher the value of $W_{25}$ or the higher the flow rate through the compressor the lower the value of X.

The heat state of each engine 10A, 10B during use or $T_{core}$ is determined or synthesized by the core temperature model 204 as each engine 10A, 10B is being run. In addition, $T_3$ and $W_{25}$ are determined (e.g., measured) or synthesized by the onboard model 202 and/or the controller 102 as each engine 10A, 10B is being operated.

At engine shutdown, the current or most recently determined heat state of the engine or $T_{core\ shutdown}$ of an engine 10A, 10B is recorded into data storage unit (DSU) 104, and the time of the engine shutdown $t_{shutdown}$ is recorded into the DSU 104. The DSU 104 retains data between shutdowns using non-volatile memory. Each engine 10A, 10B may have a separate DSU 104. Time values and other parameters may be received on digital communication bus 106 and/or cross engine bus 106A. As long as electrical power is present for the controller 102 and DSU 104, additional values of temperature data may be monitored for comparison with modeled temperature data to validate one or more temperature models (e.g., onboard model 202 and/or core temperature model 204) of each gas turbine engine 10A, 10B.

During an engine start sequence or restart sequence, a bowed rotor start risk model 206 (also referred to as risk model 206) of the controller 102 is provided with the data stored in the DSU 104, namely $T_{core\ shutdown}$ and the time of the engine shutdown $t_{shutdown}$. In addition, the bowed rotor start risk model 206 is also provided with the time of engine start $t_{start}$ and the ambient temperature of the air provided to the inlet of each engine 10A, 10B $T_{inlet}$ or $T_2$. $T_2$ is a sensed value as opposed to the synthesized value of $T_3$ in some embodiments. In some embodiments, an oil temperature ($T_{oil}$) is a sensed value that can be used to determine a current temperature in combination with $T_{core}$ and/or $T_2$. For instance, once oil stops circulating at shutdown, $T_{oil}$ can provide a localized temperature reading indicative of a bearing compartment temperature from which temperatures at various engine locations can be derived.

The bowed rotor start risk model 206 maps core temperature model data with time data and ambient temperature data to establish a motoring time $t_{motoring}$ as an estimated period of motoring to mitigate a bowed rotor of each gas turbine engine 10A, 10B. The motoring time $t_{motoring}$ is indicative of a bowed rotor risk parameter computed by the bowed rotor start risk model 206. For example, a higher risk of a bowed rotor may result in a longer duration of dry motoring to reduce a temperature gradient prior to starting each gas turbine engine 10A, 10B of FIG. 1. In one embodiment, an engine start sequence may automatically include a modified start sequence; however, the duration of the modified start sequence prior to a normal start sequence will vary based upon the time period $t_{motoring}$ that is calculated by the bowed rotor start risk model 206. The motoring time $t_{motoring}$ for predetermined target speed $N_{target}$ of each engine 10A, 10B is calculated as a function of $T_{core\ shutdown}$, $t_{shutdown}$, $t_{start}$, $T_2$ and/or $T_{oil}$, (e.g., f ($T_{core\ shutdown}$, $t_{shutdown}$, $t_{start}$, $T_2$ and/or $T_{oil}$), while a target speed $N_{target}$ is a predetermined speed that can be fixed or vary within a predetermined speed range of $N_{targetMin}$ to $N_{targetMax}$. In other words, the target speed $N_{target}$ may be the same regardless of the calculated time period $t_{motoring}$ or may vary within the predetermined speed range of $N_{targetMin}$ to $N_{targetMax}$. The target speed $N_{target}$ may also be referred to as a dry motoring mode speed. In some embodiments, the target speed $N_{target}$ defines a speed threshold that may be set statically or dynamically adjusted based on coordination commands from engine control interfaces 105A, 105B to determine when to command a corresponding starter air valve 116A, 116B or a corresponding starter switch 416A, 416B to close/open, for example.

Based upon these values ($T_{core\ shutdown}$, $t_{shutdown}$, $t_{start}$, $T_2$ and/or $T_{oil}$) the motoring time $t_{motoring}$ for the modified start sequence of each engine 10A, 10B is determined by the bowed rotor start risk model 206. Based upon the calculated time period $t_{motoring}$ which is calculated as a time to run each engine 10A, 10B up to a predetermined target speed $N_{target}$ in order to clear a "bowed condition". In accordance with an embodiment of the disclosure, the controller 102 can run through a modified start sequence upon a start command given to each engine 10A, 10B by an operator of the engines 10A, 10B, such as a pilot of an airplane the engines 10A, 10B are used with. It is understood that the motoring time $t_{motoring}$ of the modified start sequence may be in a range of 0 seconds to minutes, which depends on the values of $T_{core\ shutdown}$, $t_{shutdown}$, $t_{start}$, $T_2$ and/or $T_{oil}$.

In an alternate embodiment, the modified start sequence may only be run when the bowed rotor start risk model 206 has determined that the motoring time $t_{motoring}$ is greater than zero seconds upon receipt of a start command given to each engine 10A, 10B. In this embodiment and if the bowed rotor start risk model 206 has determined that $t_{motoring}$ is not greater than zero seconds, a normal start sequence will be initiated upon receipt of a start command to each engine 10A, 10B.

Accordingly and during an engine command start, the bowed rotor start risk model 206 of the system 200 may be referenced wherein the bowed rotor start risk model 206 correlates the elapsed time since the last engine shutdown time and the shutdown heat state of each engine 10A, 10B as well as the current start time $t_{start}$ and the inlet air temperature $T_2$ in order to determine the duration of the modified start sequence wherein motoring of each engine 10A, 10B up to a reduced speed $N_{target}$ without fuel and ignition is required. As used herein, motoring of each engine 10A, 10B in a pre-start motoring sequence refers to the turning of a starting spool by air turbine starter 120A, 120B or electric starter 420A, 420B up to a reduced speed $N_{target}$ without introduction of fuel and an ignition source in order to cool the engine 10A, 10B to a point wherein a normal start sequence can be implemented without starting the engine 10A, 10B in a bowed rotor state. In other words, cool or ambient air is drawn into the engine 10A, 10B while motoring the engine 10A, 10B at a reduced speed in order to clear the "bowed rotor" condition, which is referred to as a dry motoring mode.

The bowed rotor start risk model 206 can output the motoring time $t_{motoring}$ to a motoring controller 208. The motoring controller 208 uses a dynamic control calculation in order to determine a required valve position of the starter air valve 116A, 116B used to supply an air supply or compressed air source 114 to the engine 10A, 10B in order to limit the motoring speed of the engine 10A, 10B up to the target speed $N_{target}$ due to the position of the starter air valve 116A, 116B. The required valve position of the starter air valve 116A, 116B can be determined based upon an air supply pressure as well as other factors including but not limited to ambient air temperature, parasitic drag on the engine 10A, 10B from a variety of engine driven components such as electric generators and hydraulic pumps, and other variables such that the motoring controller 208 closes the loop for engine motoring for the required amount of time based on the output of the bowed rotor start risk model 206. Similar computations can be performed for switch timing of the starter switches 416A, 416B, which may be limited by a maximum current limit of the electric power source 414 of FIG. 8. Local engine data 209 can also be transmitted on digital communication bus 106 to the engine control interfaces 105A, 105B including present conditions, commands, and/or scheduled adjustments of the engine starting system 101A, 101B to assist the engine control interfaces 105A, 105B or other controllers 102 determine whether motoring time changes are needed on a per engine 10A, 10B basis to ensure consistent motoring times for all engines 10A, 10B. For instance, local engine data 209 can include a measured core engine temperature, an oil temperature, an ambient air temperature, an ambient pressure, a starting spool speed, and the like. The local engine data 209 can also include a number of control parameters such as a baseline dry motoring profile and/or adjustments to the baseline dry motoring profile (e.g., timing adjustments). Remote engine data 205 can be received including equivalent of local engine data 209 for one or more other engines 10A, 10B. The remote engine data 205 can be used to extend the motoring time for the engine 10A, 10B controlled by the motoring controller 208. The motoring controller 208 can extend the initial value of the motoring time predicted by the bowed rotor start risk model 206 to synchronize motoring time across the engines 10A, 10B, whether controlled according to one or more target speeds and/or a dry motoring profile. In alternate embodiments, the bowed rotor start risk model 206 is omitted and motoring timing and/or other motoring constraints are received via the digital communication bus 106.

In one embodiment, the dynamic control of the valve position (e.g., open state of the valve (e.g., fully open, ½ open, ¼ open, etc.) in order to limit the motoring speed of the engine 10A, 10B) is controlled via duty cycle control (on/off timing using pulse width modulation) of electromechanical device 110A, 110B for starter air valves 116A, 116B. When variable position starter air valves are used as the starter air valves 116A, 116B, a valve angle 207 can be provided to motoring control 208 based on valve angle feedback. A rotor speed N2 can be provided to the motoring controller 208 and a mitigation monitor 214, where motoring controller 208 and a mitigation monitor 214 may be part of controller 102.

The risk model 206 can determine a bowed rotor risk parameter that is based on the heat stored ($T_{core}$) using a mapping function or lookup table. When not implemented as a fixed rotor speed, the bowed rotor risk parameter can have an associated dry motoring profile defining a target rotor speed profile over an anticipated amount of time for the motoring controller 208 to send control signals 210, such as valve control signals for controlling starter air valves 116A, 116B of FIG. 3 or starter switches 416A, 416B of FIG. 8.

The bowed rotor risk parameter may be quantified according to a profile curve selected from a family of curves that align with observed aircraft/engine conditions that impact turbine bore temperature and the resulting bowed rotor risk. In some embodiments, an anticipated amount of dry motoring time can be used to determine a target rotor speed profile in a dry motoring profile for the currently observed conditions. As an example, one or more baseline characteristic curves for the target rotor speed profile can be defined in tables or according to functions that may be rescaled to align with the observed conditions.

In summary with reference to FIG. 5, as one example of an aircraft 5 that includes systems as described herein, onboard model 202 and core temperature model 204 may run on controller 102 of the aircraft 5 to track heat stored ($T_{core}$) in the turbine at the time of engine shutdown. Modeling of potential heat stored in the system may be performed as a turbine disk metal temperature model in the core temperature model 204. When the aircraft lands, engines typically operate at idle for a cool down period of time, e.g., while taxiing to a final destination. When an engine shutdown is detected, model state data can be logged by the DSU 104 prior to depowering. When the controller 102 powers on at a later time and model state data can be retrieved from the DSU 104, and the bowed rotor start risk model 206 can be updated to account for the elapsed time. When an engine start is requested, a bowed rotor risk can be assessed with respect to the bowed rotor start risk model 206. Extended dry motoring can be performed during an engine start process until the bow risk has sufficiently diminished. The state of or changes to the local engine data 209 and remote engine data 205 can start/stop dry motoring and/or result in adjustments to motoring time and/or a dry motoring profile used to drive control signals 210 such that the motoring time is the same for all engines 10A, 10B.

In reference to FIG. 5, the mitigation monitor 214 can operate in response to receiving a complete indicator 212 to run a verification of the bowed rotor mitigation. The mitigation monitor 214 can provide mitigation results 216 to the motoring controller 208 and may provide result metrics 218 to other systems, such a maintenance request or indicator. The mitigation monitor 214 may also run while dry motoring is active to determine whether adjustments to the dry motoring profile are needed. If the mitigation monitor 214 determines that a bowed rotor condition still exists, the motoring controller 208 may restart dry motoring, or a maintenance request or indicator can be triggered along with providing result metrics 218 for further analysis. Metrics of attempted bowed rotor mitigation can be recorded in the DSU 104 based on determining that the attempted bowed rotor mitigation was unsuccessful or incomplete. Mitigation results 216 and/or result metrics 218 may also be included in the local engine data 209 sent to engine control interfaces 105A, 105B of FIG. 1.

Figure 6:
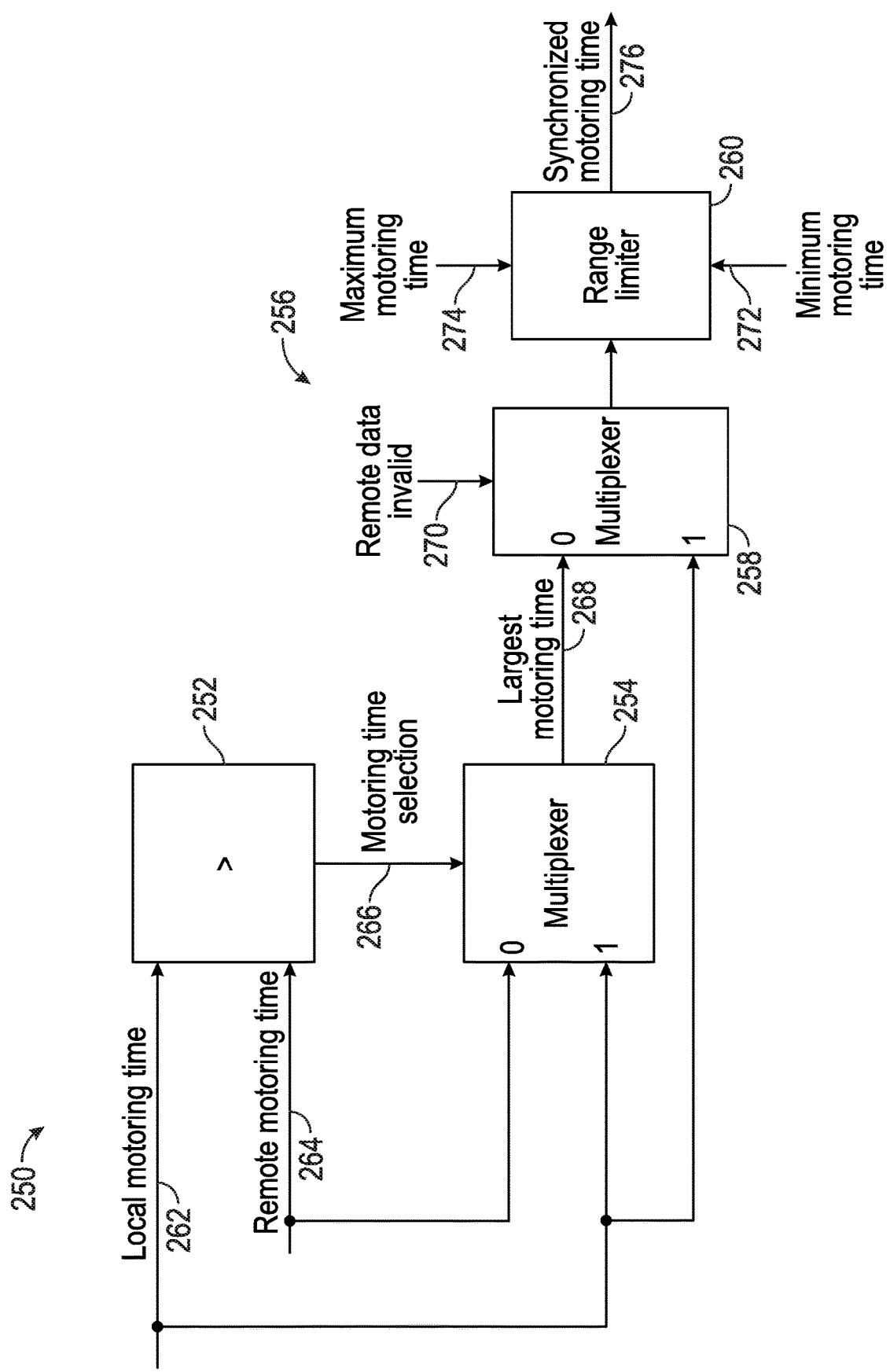
FIG. 6 is a block diagram of motoring time synchronization logic in accordance with an embodiment of the disclosure.

FIG. 6 is a block diagram of motoring time synchronization logic 250 for pre-start motoring synchronization for multiple engines in accordance with an embodiment. Although inputs from only two engines are depicted in the example of FIG. 6, it will be understood that the design can scale to any number of engines (e.g., a four engine aircraft). The motoring time synchronization logic 250 may be part of either or both of the engine control interfaces 105A, 105B of FIG. 1 or either or both of the FADECs 102A, 102B, for instance, as part of motoring controller 208 of FIG. 5.

In the example of FIG. 6, the motoring time synchronization logic 250 includes comparison logic 252, selection logic 254, and protection logic 256. The comparison logic 252 can determine whether a local motoring time 262 or a remote motoring time 264 is larger, where the local motoring time 262 is an initial value of a motoring time of a first engine starting system (e.g., engine starting system 101A for engine 10A of FIG. 1) and the remote motoring time 264 is an initial value of a motoring time of one or more other engine starting systems (e.g., engine starting system 101B for engine 10B of FIG. 1). The selection logic 254 can be implemented as a multiplexer, where a motoring time selection 266 is used to select either the local motoring time 262 or the remote motoring time 264 as the largest motoring time 268.

The protection logic 256 can include a valid data selector 258 and a range limiter 260. The valid data selector 258 can be implemented as a multiplexer that selects either the largest motoring time 268 or the local motoring time 262 based on a remote data validity status, such as a remote data invalid indicator 270. The remote data invalid indicator 270 can indicate whether the remote motoring time 264 should be considered valid or invalid, e.g., due to known communication issues and/or operating conditions. The range limiter 260 can apply limits of a minimum motoring time 272 and/or a maximum motoring time 274 to produce a synchronized motoring time 276 as a range limited version of the largest motoring time 268 provided that valid data is available. The synchronized motoring time 276 is used as the motoring time for each engine 10A, 10B under normal operating conditions of the pre-start motoring sequence. There can be some variation in the synchronized motoring time 276 for each engine 10A, 10B within a synchronization tolerance. For example, offsets or adjustments may be incorporated to account for minor variations in timing due to system lags or alternating use of a shared power source such that the actual motoring times need not be exactly the same to be considered a synchronized match. In some embodiments, the motoring times of engines 10A and 10B are synchronized as a match within a synchronization tolerance of one second or less. In other embodiments, the synchronization tolerance is one minute or less for a synchronized match of the motoring times between engines 10A and 10B.

Figure 7:
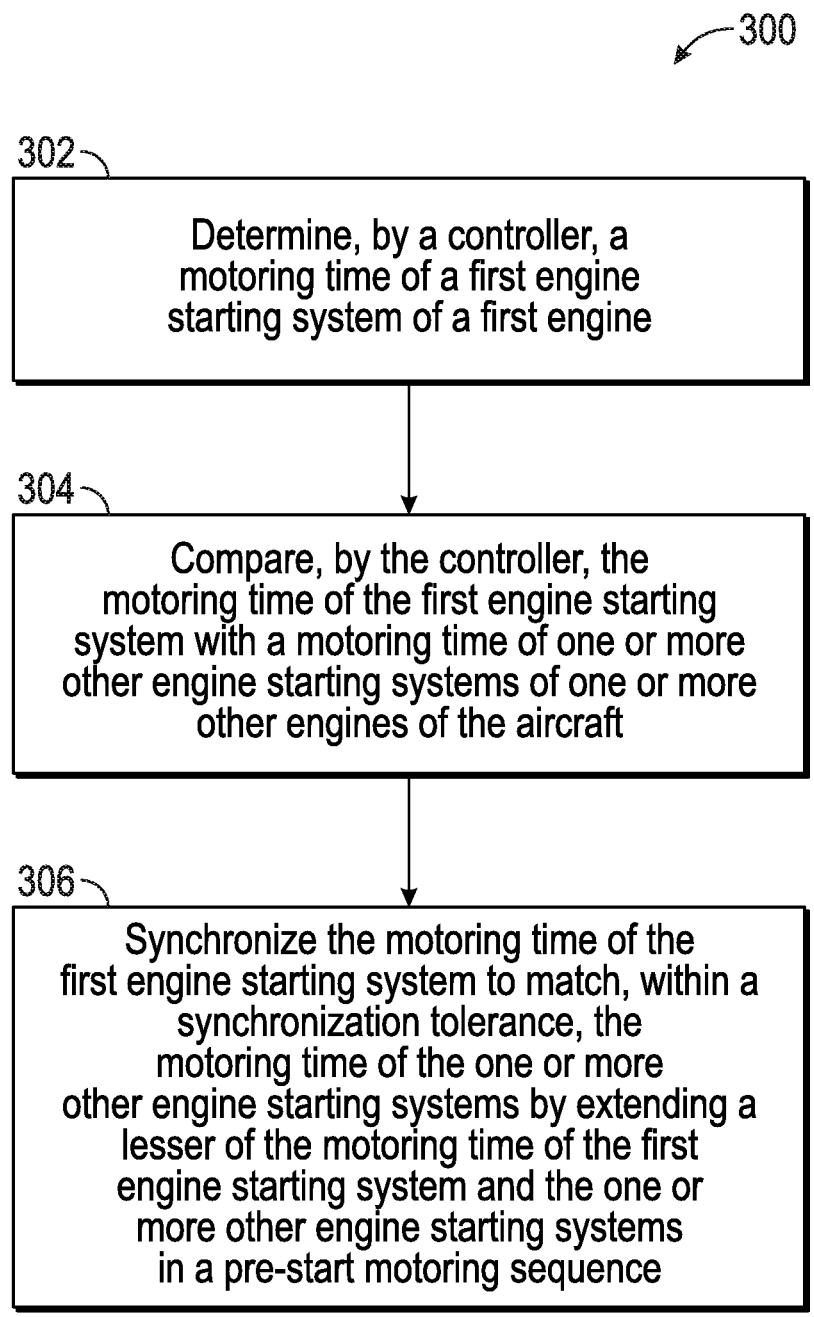
FIG. 7 is a flow chart illustrating a method in accordance with an embodiment of the disclosure.

FIG. 7 is a flow chart illustrating a method 300 for pre-start motoring synchronization for multiple engines 10A, 10B of an aircraft 5 in accordance with an embodiment. The method 300 of FIG. 7 is described in reference to FIGS. 1-6 and 8 and may be performed with an alternate order and include additional steps. The method 300 is described with engine starting system 101A referred to as a first engine starting system for engine 10A and engine starting system 101B as one or more other engine starting systems for engine 10B; however, it will be understood that the designations of first and one or more other engine starting systems can be assigned with alternate definitions.

At block 302, a controller (e.g., FADEC 102A) determines a motoring time of a first engine starting system (e.g., engine starting system 101A) of a first engine (e.g., engine 10A). At block 304, the controller (e.g., FADEC 102A) compares the motoring time of the first engine starting system with a motoring time of one or more other engine starting systems (e.g., engine starting system 101B) of one or more other engines (e.g., engine 10B) of the aircraft 5. At block 306, the motoring time of the first engine starting system is synchronized to match, within a synchronization tolerance, the motoring time of the one or more other engine starting systems by extending a lesser of the motoring time of the first engine starting system and the one or more other engine starting systems in a pre-start motoring sequence. The synchronization tolerance accounts for minor timing variations (e.g., a minute or less) between the first engine starting system and the one or more other engine starting systems such that motoring times need not be exactly the same to establish a synchronized match. At least one engine control interface 105A, 105B can coordinate synchronization of the motoring time of the first gas turbine engine with the motoring time of one or more other gas turbine engines. Actual computed motoring times can be communicated or values used to determine/select motoring times can be communicated (e.g., a table index, a dry motoring profile identifier, a seed value for determining a motoring time, and the like).

The motoring time of the first engine starting system can be synchronized with the one or more other engine starting systems by comparing an initial value of the motoring time of the first engine starting system with an initial value of the motoring time of the one or more other engine starting systems (e.g., local motoring time 262 and remote motoring time 264) and selecting a largest value as the motoring time for the first engine starting system and the one or more other engine starting systems (e.g., using comparison logic 252 and selection logic 254 to determine largest motoring time 268). The controller can provide the initial value of the motoring time of the first engine starting system to one or more other controllers and receive the initial value of the motoring time of the one or more other engine starting systems from the one or more other controllers (e.g., on digital communication bus 106 and/or cross engine bus 106A). The controller can maintain the motoring time of the first engine starting system as the initial value of the motoring time of the first engine starting system based on determining that the initial value of the motoring time of the first engine starting system is greater than or equal to the initial value of the motoring time of the one or more other engine starting systems. The pre-start motoring sequence can include simultaneous motoring of the first engine and the one or more other engines. Alternatively, the pre-start motoring sequence can include sequential motoring of the first engine and the one or more other engines. The controller is operable to control the first engine starting system to maintain a starting spool speed of the first engine below a resonance speed during the motoring time of the first engine starting system. The controller is further operable to validate the motoring time of the one or more other engine starting systems and range limit the motoring time of the first engine starting system prior to performing motoring of the first engine during the pre-start motoring sequence.

Accordingly and as mentioned above, it is desirable to detect, prevent and/or clear a "bowed rotor" condition in a gas turbine engine that may occur after the engine has been shut down. As described herein and in one non-limiting embodiment, the FADECs 102A, 102B (e.g., controller 102) and/or engine control interfaces 105A, 105B may be programmed to automatically take the necessary measures in order to provide for a modified start sequence without pilot intervention other than the initial start request. In an exemplary embodiment, the FADECs 102A, 102B, DSU 104 and/or engine control interfaces 105A, 105B each comprises a microprocessor, microcontroller or other equivalent processing device capable of executing commands of computer readable data or program for executing a control algorithm and/or algorithms that control the start sequence of the gas turbine engine. In order to perform the prescribed functions and desired processing, as well as the computations therefore (e.g., the execution of Fourier analysis algorithm(s), the control processes prescribed herein, and the like), the FADECs 102A, 102B, DSU 104 and/or engine control interfaces 105A, 105B may include, but not be limited to, a processor(s), computer(s), memory, storage, register(s), timing, interrupt(s), communication interfaces, and input/output signal interfaces, as well as combinations comprising at least one of the foregoing. For example, the FADECs 102A, 102B, DSU 104 and/or engine control interfaces 105A, 105B may include input signal filtering to enable accurate sampling and conversion or acquisitions of such signals from communications interfaces. As described above, exemplary embodiments of the disclosure can be implemented through computer-implemented processes and apparatuses for practicing those processes.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system for pre-start motoring control for multiple engines of an aircraft, the system comprising:
a first engine starting system of a first engine; and
a controller operable to control a motoring time of the first engine starting system relative to one or more other engine starting systems of one or more other engines of the aircraft by adjusting the motoring time of the first engine starting system within a tolerance of a motoring time of the one or more other engine starting systems in a pre-start motoring sequence based on comparing the motoring time of the first engine starting system with the motoring time of the one or more other engine starting systems.

2. The system as in claim 1, wherein the motoring time of the first engine starting system is controlled relative to the one or more other engine starting systems by comparing a first value of the motoring time of the first engine starting system with a first value of the motoring time of the one or more other engine starting systems and selecting larger value as the motoring time for the first engine starting system and the one or more other engine starting systems.

3. The system as in claim 2, wherein the controller provides the first value of the motoring time of the first engine starting system to one or more other controllers and receives the first value of the motoring time of the one or more other engine starting systems from the one or more other controllers.

4. The system as in claim 2, wherein the controller maintains the motoring time of the first engine starting system as the first value of the motoring time of the first engine starting system based on determining that the first value of the motoring time of the first engine starting system is greater than or equal to the first value of the motoring time of the one or more other engine starting systems.

5. The system as in claim 1, wherein the pre-start motoring sequence comprises simultaneous motoring of the first engine and the one or more other engines.

6. The system as is claim 1, wherein the pre-start motoring sequence comprises sequential motoring of the first engine and the one or more other engines.

7. The system as in claim 1, wherein the controller is operable to control the first engine starting system to maintain a starting spool speed of the first engine below a resonance speed during the motoring time of the first engine starting system.

8. The system as in claim 1, wherein the controller is further operable to validate the motoring time of the one or more other engine starting systems and range limit the motoring time of the first engine starting system prior to performing motoring of the first engine during the pre-start motoring sequence.

9. A system of an aircraft, the system comprising:
a first engine system comprising a first gas turbine engine, a first starter, and a first controller operable to control the first starter to perform motoring of the first gas turbine engine in a pre-start motoring sequence; and
a second engine system comprising a second gas turbine engine, a second starter, and a second controller operable to control the second starter to perform motoring of the second gas turbine engine in the pre-start motoring sequence, wherein a motoring time of the first gas turbine engine is controlled within a tolerance of a motoring time of the second gas turbine engine by adjusting the motoring time of the first gas turbine engine relative to the motoring time of the second gas turbine engine based on comparing the motoring time of the first gas turbine engine with the motoring time of the second gas turbine engine.

10. The system of claim 9, wherein at least one engine control interface coordinates the motoring time of the first gas turbine engine relative to the motoring time of the second gas turbine engine.

11. The system of claim 9, wherein the first controller and the second controller exchange first values of the motoring time of the first gas turbine engine and the motoring time of the second gas turbine engine and select a larger value as the motoring time of the first gas turbine engine and the motoring time of the second gas turbine engine.

12. The system of claim 9, wherein the pre-start motoring sequence comprises simultaneous motoring of the first gas turbine engine and the second gas turbine engine.

13. The system of claim 9, wherein the pre-start motoring sequence comprises sequential motoring of the first gas turbine engine and the second gas turbine engine.

14. The system of claim 9, wherein the motoring time of the first gas turbine engine and the motoring time of the second gas turbine engine are validated and range limited prior to performing motoring of the first gas turbine engine and the second gas turbine engine during the pre-start motoring sequence.

15. A method for pre-start motoring control for multiple engines of an aircraft, the method comprising:
determining, by a controller, a motoring time of a first engine starting system of a first engine;
comparing, by the controller, the motoring time of the first engine starting system with a motoring time of one or more other engine starting systems of one or more other engines of the aircraft; and
controlling the motoring time of the first engine starting system relative to a tolerance of the motoring time of the one or more other engine starting systems by adjusting the motoring time of the first engine starting system relative to the one or more other engine starting systems in a pre-start motoring sequence based on comparing the motoring time of the first engine starting system with the motoring time of the one or more other engine starting systems.

16. The method as in claim 15, wherein the controller maintains the motoring time of the first engine starting system as a first value of the motoring time of the first engine starting system based on determining that the first value of the motoring time of the first engine starting system is greater than or equal to a first value of the motoring time of the one or more other engine starting systems.

17. The method as in claim 15, wherein the pre-start motoring sequence comprises simultaneous motoring of the first engine and the one or more other engines.

18. The method as in claim 15, wherein the pre-start motoring sequence comprises sequential motoring of the first engine and the one or more other engines.

19. The method as in claim 15, further comprising controlling the first engine starting system to maintain a starting spool speed of the first engine below a resonance speed during the motoring time of the first engine starting system, and the motoring time of the first engine starting system is determined by the controller using a bowed rotor start risk model based on a target speed, a temperature at shutdown, a time of engine shutdown, a current engine temperature, and an ambient temperature.

20. The method as in claim 15, further comprising:
  validating the motoring time of the one or more other engine starting systems; and
  range limiting the motoring time of the first engine starting system prior to performing motoring of the first engine during the pre-start motoring sequence.

* * * * *